(12) United States Patent
Pourchot et al.

(10) Patent No.: US 9,915,424 B2
(45) Date of Patent: Mar. 13, 2018

(54) COAL FIRED OXY PLANT WITH FLUE GAS HEAT RECOVERY

(71) Applicant: General Electric Technology GmbH, Baden (CH)

(72) Inventors: Thierry Pourchot, Naves Parmelan (FR); Francois Granier, Vetrigne (FR); Frederic Geiger, Giromagny (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 229 days.

(21) Appl. No.: 14/675,305

(22) Filed: Mar. 31, 2015

(65) Prior Publication Data

US 2015/0369483 A1 Dec. 24, 2015

(30) Foreign Application Priority Data

May 8, 2014 (EP) ..................... 14290139

(51) Int. Cl.
*F01K 7/40* (2006.01)
*F22D 1/36* (2006.01)
(Continued)

(52) U.S. Cl.
CPC ............... *F23L 7/007* (2013.01); *F01K 7/40* (2013.01); *F01K 13/00* (2013.01); *F22D 1/36* (2013.01);
(Continued)

(58) Field of Classification Search
CPC ... B01D 2257/504; Y02E 20/14; Y02E 20/16; Y02E 20/34; Y02E 20/344; Y02C 10/06;
(Continued)

(56) References Cited

U.S. PATENT DOCUMENTS 2,921,441 A 1/1960 Buri
2,991,620 A 7/1961 Nekolny
(Continued)

FOREIGN PATENT DOCUMENTS

DE 10 2004 059358 A1 6/2005
DE 102009014185 A1 9/2010
(Continued)

OTHER PUBLICATIONS

Partial English Translation of Beer S et al: "Massnahmen Zur Steigerung Des Netto-Wirkungsgrades An Einem Bestehenden 300-MW-Block", Vgb Kraftwerkstechnik, Vgb Kraftwerkstechnik GMBH. Essen, DE, vol. 77, No. 5, May 1, 1997 (May 1, 1997), pp. 358-362, XP000690909, ISSN: 0372-5715).*
(Continued)

*Primary Examiner* — Laert Dounis

(57) ABSTRACT

A coal fired Oxy boiler power plant with a condensate system, combustion system and post combustion CO2 capture plant configured and arranged to remove CO2 from a flue gas stream generated in the combustion system. The condensation system includes a plurality of serial low pressure heaters arranged in flow series downstream of the pump and at least one parallel low pressure heater arranged fluidly parallel to at least one of the serial low pressure heaters. Flue Gas Heat Recovery System, Flue Gas Condenser and Gas Processing unit are thermally integrated into the condensate system.

20 Claims, 3 Drawing Sheets

(51) Int. Cl.
*F23L 7/00* (2006.01)
*F01K 13/00* (2006.01)
*F23J 15/02* (2006.01)
*F23J 15/06* (2006.01)

(52) U.S. Cl.
CPC ............... *F23J 15/02* (2013.01); *F23J 15/06* (2013.01); *F23J 2215/50* (2013.01); *Y02E 20/326* (2013.01); *Y02E 20/344* (2013.01); *Y02E 20/363* (2013.01)

(58) Field of Classification Search
CPC ..................... Y02C 10/08; Y02C 10/14; F01K 17/34–17/44
USPC ............... 60/685, 690–693; 423/220, 437.1; 110/345; 95/139, 183
See application file for complete search history.

(56) References Cited

U.S. PATENT DOCUMENTS

| | | | |
|---|---|---|---|
| 3,032,999 A | 5/1962 | Pacault | |
| 3,271,960 A | 9/1966 | Brunner | |
| 3,374,621 A | 3/1968 | Pacault et al. | |
| 3,423,933 A | 1/1969 | Knizia | |
| 3,835,650 A | 9/1974 | Chesmejef | |
| 4,069,674 A | 1/1978 | Warren | |
| 4,516,403 A | 5/1985 | Tanaka | |
| 4,729,217 A | 3/1988 | Kehlhofer | |
| 4,897,999 A | 2/1990 | Varney | |
| 4,976,107 A | 12/1990 | Korpela | |
| 5,344,627 A * | 9/1994 | Fujii | B01D 53/1418 423/220 |
| 5,345,756 A | 9/1994 | Jahnke et al. | |
| 5,836,162 A | 11/1998 | Haynes | |
| 7,581,395 B2 * | 9/2009 | Takeuchi | F22D 1/36 60/653 |
| 2002/0023423 A1 | 2/2002 | Viteri et al. | |
| 2005/0235650 A1 | 10/2005 | Griffin et al. | |
| 2006/0254251 A1 * | 11/2006 | Yamada | F01K 3/247 60/39.19 |
| 2008/0302107 A1 * | 12/2008 | Fan | B01D 53/002 60/783 |
| 2009/0178408 A1 * | 7/2009 | Brugerolle | F25J 3/0406 60/645 |
| 2010/0071380 A1 | 3/2010 | Buecker et al. | |
| 2010/0132360 A1 * | 6/2010 | Gericke | F01K 3/20 60/653 |
| 2010/0258005 A1 * | 10/2010 | Oishi | F22D 1/003 95/156 |
| 2011/0220744 A1 | 9/2011 | Zhao et al. | |
| 2011/0277479 A1 * | 11/2011 | Richter | B01D 53/1425 60/685 |
| 2011/0290163 A1 | 12/2011 | Kobayashi | |
| 2012/0111007 A1 | 5/2012 | Frueh et al. | |
| 2012/0129112 A1 | 5/2012 | Cegarra Cruz et al. | |
| 2012/0151917 A1 * | 6/2012 | Ungerer | F01K 3/18 60/641.15 |
| 2012/0216540 A1 | 8/2012 | Stoever et al. | |
| 2012/0324893 A1 * | 12/2012 | Hayashi | F01K 7/40 60/691 |
| 2013/0062883 A1 * | 3/2013 | Kaneeda | F22B 1/18 290/52 |
| 2013/0099508 A1 | 4/2013 | Handagama et al. | |
| 2014/0007576 A1 | 1/2014 | Alekseev | |
| 2014/0065559 A1 * | 3/2014 | Jukkola | F22B 31/0076 431/7 |
| 2015/0323180 A1 * | 11/2015 | Pourchot | F23J 15/06 60/692 |
| 2016/0033128 A1 * | 2/2016 | Stuxberg | F01K 23/10 60/645 |

FOREIGN PATENT DOCUMENTS

| | | |
|---|---|---|
| EP | 2682569 A1 | 1/2014 |
| EP | 2 706 294 A1 | 3/2014 |
| JP | 06002806 A * | 1/1994 |
| WO | WO 2009/010931 A2 | 1/2009 |
| WO | 2011006862 A2 | 1/2011 |

OTHER PUBLICATIONS

European Search Report for EP 14290139.6 dated Jan. 28, 2015.
S. Beer et al., "Maßnahmen zur Steigerung des Netto-Wirkungsgrades an einem bestehenden 300-MW-Block", VGB Kraftwerkstechnik GMBH, May 1, 1997, pp. 358-362, vol. 77, No. 5.
Thierry Pourchot et al., "Integration of Oxy Cumbustion in a Large Size USC PC Plant for a Competitive Solution", 3rd Oxyfuel Combustion Conference, Spain, pp. 20, Sep. 12, 2013.
Bouillon et al., "ECO2 : Post-Combustion of Oxyfuel—A Comparison Between Coal Plants with Integrated Co2 capture" Energy Procedia, vol. No. 01, pp. 4015-4022, 2009.
European Search Report and Opinion issued in connection with Related EP Application No. 14290138.8 dated Jan. 28, 2015, 6 pages.
European Search Report and Opinion issued in connection with Related EP Application No. 14290140.4 dated Jan. 28, 2015.
European Search Report and Opinion issued in connection with Related EP Application No. 14290141.2 dated Jan. 28, 2015.

* cited by examiner

COAL FIRED OXY PLANT WITH FLUE GAS HEAT RECOVERY

TECHNICAL FIELD

The present disclosure relates to thermal arrangement of coal fired oxy plants that integrate CO2 capture and a steam/water power cycle.

BACKGROUND INFORMATION

Coal contributes a large percentage of the electricity generation in the world today and is expected to maintain its dominant share in the foreseeable future. Nonetheless, significant environmental pressures have led to the development of emission reduction systems to meet every increasing environmental demands. As a result, plant designs have had to meeting the contradictory requirements of high efficiency operation at reduced CO2, SO2, NOx, emission levels.

A particular advantageous plant arrangement arising out of these developments is the Oxy-combustion steam plant with CO2 capture. Rather than operating an air combustion system, the system uses oxygen, usually produced in an air separation unit for the combustion of the primary fuel. Oxy-combustion processes produce flue gas typically having CO2, water and O2 as its main constituents wherein the CO2 concentration is typically greater than about 70% by volume. The high concentration of CO2 enables relatively simply CO2 Capture in a Gas Processing Unit.

A typical arrangement of an oxy-combustion capture plant includes several pre CO2 extraction purification steps. These may include an Electrostatic Precipitator for removing particulate matter, a Flue Gas Desulfuriser for removing sulphur, and a Flue gas condenser for water removal. For reasons of thermal efficiency, a Flue Gas Heat Recovery System may additionally be located between the Electrostatic Precipitator and Flue Gas Desulfuriser.

An example of a typical water steam cycle of a high efficiency oxy-combustion steam plant is shown in FIG. 1. The plant comprises a triple-pressure series of reheat steam turbines (HP, IP, LP) fed by steam from a boiler 42. Exhaust steam from the last low pressure steam turbine LP is condensed in a condenser 2 before being polished 4 and pumped 3 successively through a series of low pressure heaters, 6, 7, 8, 9, 31, a feed water tank 36 and high pressure heaters 10 before returning to the boiler 42 in a closed loop. The heat source for the low and high pressure heaters is typically steam extracted from the low/intermediate and high pressure steam turbines.

Due to the large benefit in ensuring the highest efficiency cycle, there is a continuing need to find ways of better integrating the thermal sinks of the oxy-combustion capture systems within the steam power plant. This requires an optimization of the heat sinks of the capture systems with the plant cycle to ensure no energy is wasted. In particular, this needs consideration of how to integrate the Air Separation Unit, Flue Gas Heat Recovery System, Flue Gas Condenser, and Gas Processing Unit into the steam cycle.

SUMMARY

A coal fired Oxy boiler with oxygen supply system and flue gas CO2 capture system and a steam cycle power plant scheme is provided that integrates major heat generation sources of the systems in order to provide flexible plant operation and improved overall plant thermal efficiency.

The disclosure is based on the general idea of providing a solution of how to integrate heat sources of the Air Separation Unit, Flue Gas Heat Recovery System, Flue Gas Condenser and Gas Processing Unit into the steam plant condensate system.

In an aspect the coal fired Oxy boiler power plant includes a water/steam power cycle, condensate system, a combustion system and a CO2 capture system.

The condensate system comprises a pump for pressuring condensate, a plurality of serial low pressure heaters arranged in flow series numbered starting from one and extending to two, three, four etc, downstream of the pump, and at least one parallel low pressure heater arranged fluidly parallel to at least one of the serial low pressure heaters. The combustion system has an Air Separation Unit for generating an oxygen rich stream wherein the Air Separation Unit has an Air Separation Unit heat exchanger with an Air Separation Unit heat exchanger condensate line connected to the condensate system such that the Air Separation Unit heat exchanger is fluidly parallel to at least two of the serial low pressure heaters.

The combustion system comprises a steam boiler for burning coal with the oxygen rich stream having a flue gas stream.

The CO2 capture system is configured and arranged to remove CO2 from the flue gas stream and has a Flue Gas Heat Recovery System, a Flue Gas Condenser and Gas Processing Unit. Each of these systems and units may be individually and separately thermally integrated into the condensate system by condensate lines connect to either condensate system heat exchangers or directly to the condensate system.

In an aspect, the Flue Gas Heat Recovery System has a Flue Gas Heat Recovery System heat exchanger and a Flue Gas Heat Recovery System thermal fluid line connected to the Flue Gas Heat Recovery System heat exchanger and the at least one parallel low pressure heater so as to form a separate thermal fluid system loop that thermally connects the Flue gas Heat Recovery system to the condensate system via the at least one parallel low pressure heater.

In another aspect, the Gas Processing Unit has a heat exchanger with thermal fluid lines forming part of the separate thermal fluid system loop.

In another aspect, a zero low pressure heater is located in the condensate upstream of the serial low pressure heaters and the at least one parallel heat. In an aspect, the Flue Gas Condenser is directly connected to the condensate system either side of the zero low pressure heater.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
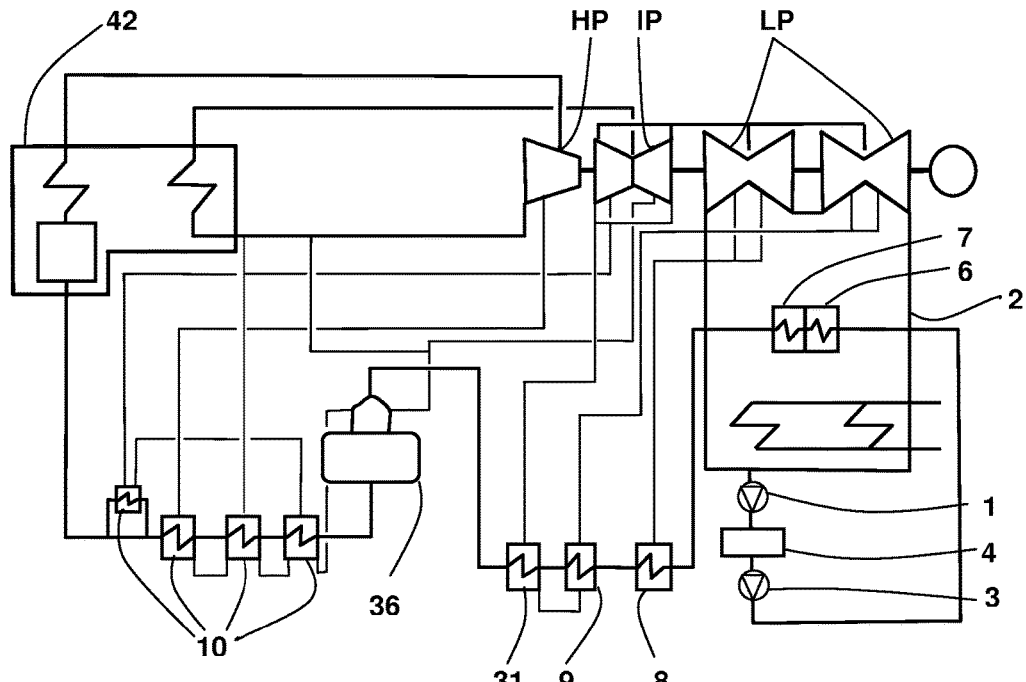
FIG. 1 is a schematic view of a prior art coal fired oxy boiler power plant.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

Figure 2:
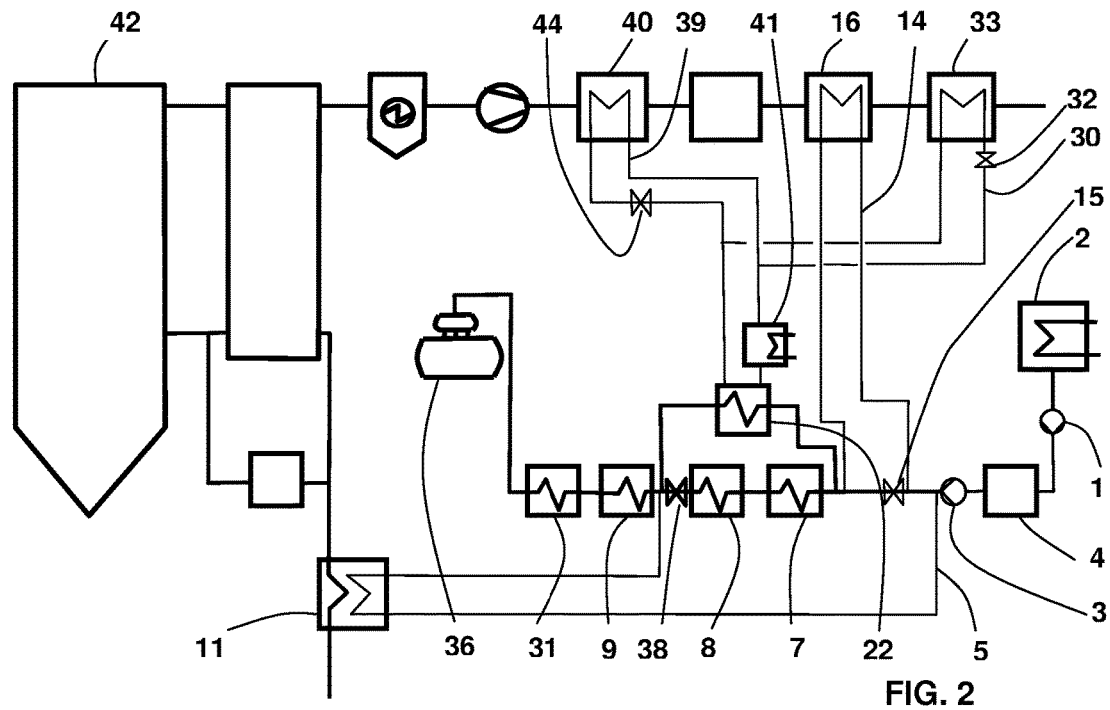
FIG. 2 is a schematic of an exemplary embodiment of a coal fired oxy boiler power plant.
Figure 3:
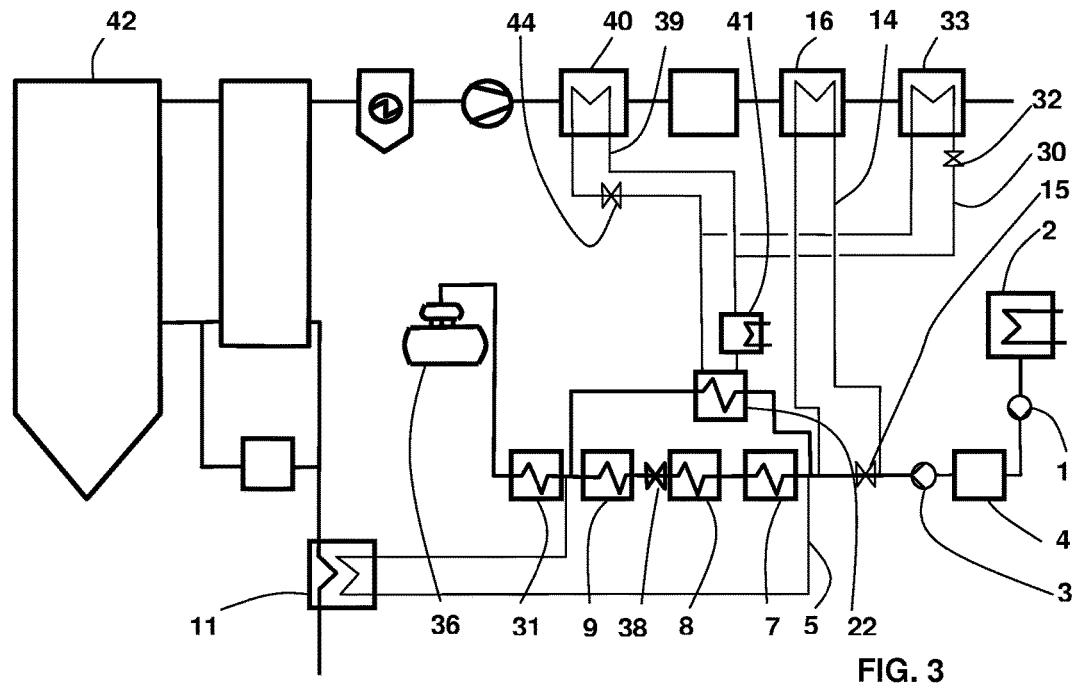
FIG. 3 is a schematic of another exemplary embodiment of a coal fired oxy boiler power plant.

As shown in FIGS. 2 and 3, an exemplary embodiment of a coal fired Oxy boiler power plant includes a water/steam power cycle with a condensate system, a combustion system and a CO2 capture system for removing CO2 from a flue gas stream generated in the combustion system.

The condensate system includes a condenser 2 for condensing steam. Once condensed the condensate is pressured by a pump 3 before being fed through a number of low pressure heaters 7, 8, 9, 22, 31 before entering feed water tank 36. A plurality of the low pressure heaters 7, 8, 9, 31 are arranged in a series to form serial low pressure heaters 7, 8, 9, 31. In parallel to at least one of the serial low pressure heaters 7, 8, 9, 31 is a parallel low pressure heater 22. The parallel low pressure heater 22 may comprise more than one parallel low pressure heaters 22 and further may be arranged such that it is parallel to more than one of the serial low pressure heaters 7, 8, 9, 31. In an exemplary embodiment shown in FIG. 2, the parallel low pressure heater 22 is arranged in parallel to the first two upstream serial low pressure heaters 7,8.

In an exemplary embodiment, the combustion system includes an Air Separation Unit for generating an oxygen rich stream. The Air Separation Unit includes an Air Separation Unit heat exchanger 11 is thermally integrated into the condensate system by means of an Air Separation Unit heat exchanger condensate line 5. The oxygen rich stream is further fed into a coal fired oxy boiler wherein the burning of coal generates a flue gas stream.

A CO2 capture system is configured to remove CO2 from the flue gas in several processing steps that may include a Flue Gas Heat Recovery system, a Flue Gas Condenser and a Gas Processing Unit. As shown in FIG. 2, in an exemplary embodiment, these systems include heat exchangers.

In an exemplary embodiment, shown in FIG. 2, the Flue Gas Heat Recovery heat exchanger 40 and the Gas Processing Unit heat exchanger 33 share a thermal fluid loop that comprises a Gas Processing Unit thermal fluid line 30 and a Flue Gas Heat Recovery System thermal fluid line 39. The thermal fluid cycle is thermally integrated into the condensate system by being connected to the at least one parallel low pressure heater 22. Optionally, as shown in FIG. 2, the thermal fluid cycle may include a back-up cooler 41 preferably in the Flue Gas Heat Recovery System thermal fluid line 39 downstream of the at least one parallel low pressure heater 22. This back-up cooler 41 has the advantage of increasing system flexibility and offering additional cooling capacity to the thermal fluid cycle thus providing thermal protection for the Flue Gas Heat Recovery System thermal fluid line 39 and Flue Gas Heat Recovery System heat exchanger 40.

In a further exemplary embodiment shown in FIG. 2, the Flue Gas Condenser heat exchanger condensate line 14 has a first end connected to the condensate system between the condensate pump 3 and the first serial low pressure heater 7 and a second end connected to the condensate system between the first end condensate system connection point and the first serial low pressure heater 7. In an exemplary embodiment, the condensate system includes a bypass valve 15 for bypassing the Flue Gas Condenser heat exchanger condensate line 14. The bypass valve 15 is located between the first end of the Flue Gas Condenser heat exchanger condensate line 14 and the second end of the Flue Gas Condenser heat exchanger condensate line 14. In this arrangement, when the bypass valve 15 is open, condensate preferentially flows through the condensate line between the first and second ends of the Flue Gas Condenser heat exchanger condensate line 14 rather than through the Flue Gas Condenser heat exchanger. To assist the bypass flow, an additional valve (not shown) may be located in the Flue Gas Condenser heat exchanger condensate line 14 wherein the additional valve is closed when the bypass valve 15 is open to initiate bypass and opened when the bypass valve is closed to direct condensate all condensate flow to the Flue Gas Condenser heat exchanger so as to enable plant operation when the Flue Gas Condenser is isolate, for example, for maintenance or non-capture operation. In an alternate exemplary embodiment, the bypass valve is partially opened to control the ratio of condensate flowing through the Flue Gas Condenser heat exchanger 16 and at the same time bypassing the Flue Gas Condenser heat exchanger 16.

In a further exemplary embodiment, shown in FIG. 2, the Gas Processing Unit thermal fluid line 30 has a first end connected to the Flue Gas Heat Recovery System thermal fluid line 39 upstream of the Flue Gas Heat Recovery System heat exchanger 40 and a second end connected to the Flue Gas Heat Recovery System thermal fluid line 39 downstream of the Flue Gas Heat Recovery System heat exchanger 40.

In an exemplary embodiment, the Gas Processing Unit thermal fluid line 30 includes a control valve 32 adapted to adjust the condensate flow through the Gas Processing Unit heat exchanger 33.

In an exemplary embodiment, the Flue Gas Heat Recovery System thermal fluid line 39 includes a control valve 44 downstream of the first end of the Gas Processing Unit thermal fluid line 30 and upstream stream of the second end of the Gas Processing Unit thermal fluid line 30 wherein the control valve 44 is adapted to adjust the thermal fluid flow through the Flue Gas Heat Recovery System heat exchanger 40.

An exemplary embodiment shown in FIGS. 2 and 3 further includes a global control valve 38 for heat recovery condensate flows of Air Separation Unit, Gas Processing Unit and Flue Gas Heat Recovery System. This control valve 38 is located in the condensate line. In an exemplary embodiment, the global control valve 38 is parallel to the at least one parallel heater 22. In another exemplary embodiment, the control valve is parallel to the at least one parallel low pressure heater 22 and downstream of the second serial low pressure heater 8 of the third of the serial low pressure heaters 9. This point may vary in different exemplary embodiments depending on the location where condensate from the at least one parallel heater 22 joins condensate passing through the serial low pressure heaters 7, 8, 9, 31.

In an exemplary embodiment, the Air Separation Unit heat exchanger condensate line 5 has a first end, upstream of the Air Separation Unit heat exchanger 11, connected to the condensate system between the first end of the Flue Gas Condenser heat exchanger condensate line 14 and the pump 3. In an alternative exemplary embodiment, the first end of the Air Separation Unit heat exchanger condensate line 5 is connected to the condensate system between the second end of the Flue Gas Condenser heat exchanger condensate line 14 and the first serial low pressure heater 7.

In an exemplary embodiment, the Air Separation Unit heat exchanger condensate line 5 has a second end, downstream of the Air Separation Unit heat exchanger 11, connected to the condensate system downstream of the at least one parallel low pressure heaters 22 and in one exemplary embodiment between the second of the serial low pressure heaters 8 and the third of the serial low pressure heaters 9 and in another exemplary embodiment between the third of the serial low pressure heaters 9 and the fourth of the serial low pressure heater 31.

Figure 4:
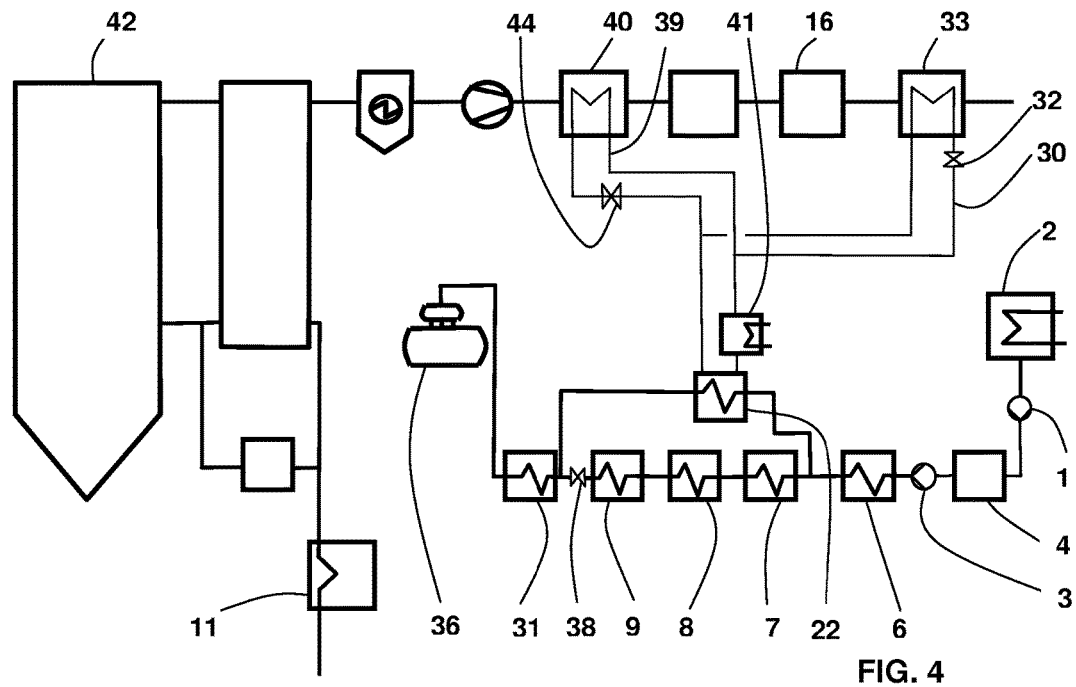
FIG. 4 is a schematic of another exemplary embodiment of a coal fired oxy boiler power plant in which only the Flue Gas Heat Recover System and Gas Processing system as thermally integrated into the condensate system.

In an exemplary embodiment shown in FIG. 4, a Gas Processing Unit system and the Flue Gas Heat Recovery System of a CO2 capture system are thermally integrated into the condensate system. This exemplary embodiment includes a zero serial low pressure heater 6 which is upstream of the serial low pressure heaters 7, 8, 9, 31. In this arrangement, the at least parallel low pressure heater 22 is parallel to the first serial low pressure heater 7 located in the condensate system downstream of the zero serial low pressure heater 6.

Figure 5:
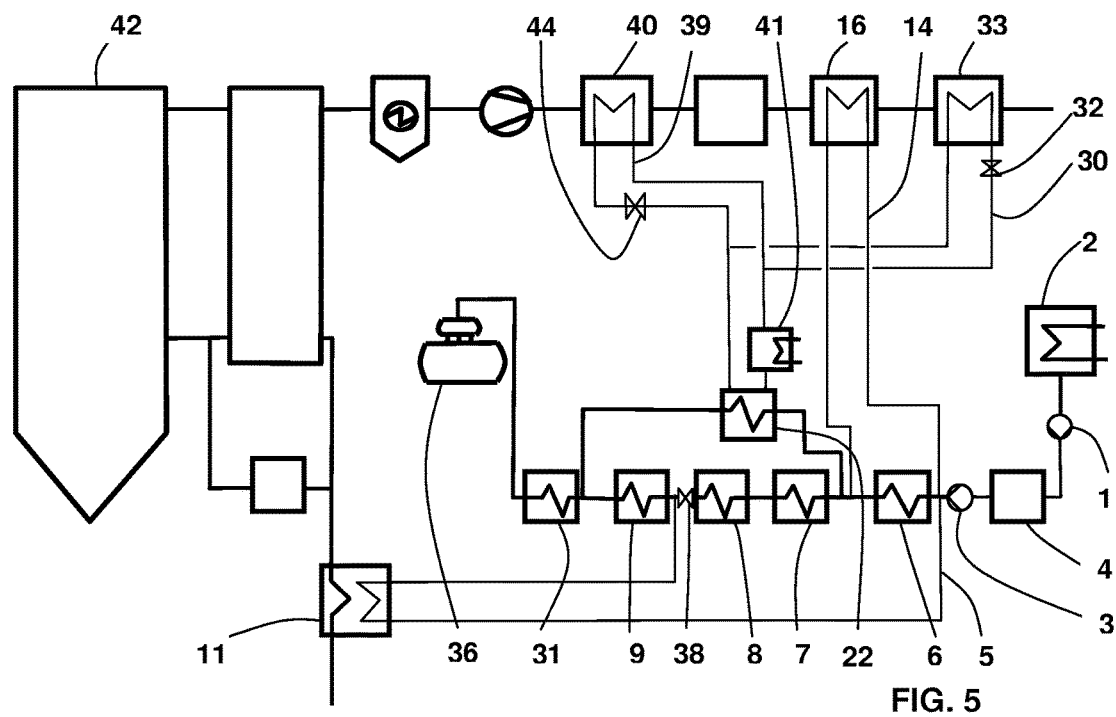
FIG. 5 is a schematic of another exemplary embodiment of a coal fired oxy boiler power plant showing integration of an Air Separation Unit and Flue Gas Condenser with a zero low pressure heater.

In an exemplary embodiment shown in FIG. 5, the Flue Gas Condenser is connected via a Flue Gas Condenser heat exchanger condensate line 14 connected at oppose ends to the condensate system either side of the of the zero serial low pressure heater 6.

In another exemplary embodiment shown in FIG. 5, an Air Separation Unit heat exchanger 11 with an Air Separation Unit heat exchanger condensate line 5 is connected to the condensate system between the pump 3 and the zero serial low pressure heater 6.

Although the disclosure has been herein shown and described in what is conceived to be the most practical exemplary embodiment, it will be appreciated by those skilled in the art that the present disclosure can be embodied in other specific forms. For example, referenced is made in the description to various systems comprising heat exchangers in the singular. Exemplary embodiment may also be applied to system comprising multiple heat exchangers arranged either in parallel or series with condensate supply and return lines. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

1 Condenser Extraction pump first stage
2 Condenser
3 pump
5 Air Separation Unit heat exchanger condensate line
4 Condensate Polishing plant
6 Serial Low Pressure heater #1
7 Serial Low Pressure heater #1
8 Serial Low Pressure heater #2
9 Serial Low Pressure heater #3
10 High Pressure heaters
11 Air Separation Unit heat exchanger
14 Flue Gas Condenser condensate line
15 Bypass valve
16 Flue Gas Condenser
22 Parallel Low Pressure heater
30 Gas Processing Unit thermal fluid line
31 Serial Low Pressure heater #4
32 Control Valve
33 Gas Processing Unit heat exchanger
36 Feed water tank
38 Control valve
39 Flue Gas Heat Recovery System thermal fluid line
40 Flue Gas Heat Recovery System heat exchanger
41 Back-up cooler
42 Boiler
44 Control Valve
HP High Pressure steam turbine
IP Intermediate pressure steam turbine
LP Low pressure steam turbine

What is claimed is:

1. A coal fired Oxy boiler power plant including:
a condensate system comprising:
   a pump for pressuring condensate;
   a plurality of serial low pressure heaters arranged in flow series downstream of the pump and numbered sequentially in a direction of condensate flow; and
   at least one parallel low pressure heater arranged fluidly parallel to at least one of a first of the serial low pressure heaters,
a CO2 capture system configured and arranged to remove CO2 from a flue gas stream of the boiler having:
   a Flue Gas Heat Recovery System having:
      a Flue Gas Heat Recovery System heat exchanger; and
      a Flue Gas Heat Recovery System thermal fluid line connected to:
         the Flue Gas Heat Recovery System heat exchanger; and
         the at least one parallel low pressure heater, and
   a Gas Processing unit having:
      a Gas Processing Unit heat exchanger;
      a Gas Processing Unit thermal fluid line connected to:
         the at least one parallel low pressure heater; and
         the Gas Processing Unit heat exchanger, wherein the Gas Processing Unit thermal fluid line comprises a first end and a second end, the first end and the second end connected to:
            the Flue Gas Heat Recovery System thermal fluid line, wherein the first end of the Gas Processing Unit thermal fluid line is connected to the Flue Gas Heat Recovery System thermal fluid line upstream of the Flue Gas Heat Recovery system heat exchanger, and the second end of the Gas Processing Unit thermal fluid line is connected to the Flue Gas Heat Recovery System thermal fluid line downstream of the Flue Gas Heat Recovery System heat exchanger,
   wherein the Flue Gas Heat Recovery System thermal fluid line and the Gas Processing Unit thermal fluid line form a thermal fluid loop.

2. The coal fired Oxy boiler power plant of claim 1 wherein the at least one parallel low pressure heater is arranged in parallel to the first of the serial low pressure heaters and a second of the serial low pressure heaters.

3. The coal fired Oxy boiler power plant of claim 1 wherein the at least one parallel low pressure heater is arranged in parallel to a first of serial low pressure heaters, a second of the serial low pressure heaters and a third of the serial low pressure heaters.

4. The coal fired Oxy boiler power plant of claim 1 wherein the at least one parallel low pressure heater consists of one parallel low pressure heater.

5. The coal fired Oxy boiler power plant of claim 1 further including a zeroth serial low pressure heater in the condensate system upstream of both the at least one parallel low pressure heater and the plurality of serial of low pressure heaters.

6. The coal fired Oxy boiler power plant of claim 5 further including a combustion system comprising an Air Separation Unit, for generating an oxygen rich stream, the Air Separation Unit having an Air Separation Unit heat exchanger with an Air Separation Unit heat exchanger condensate line comprising a first end connected to the condensate system between the pump and the zeroth serial low pressure heater.

7. The coal fired Oxy boiler power plant of claim 5 further comprising a Flue Gas Condenser heat exchanger that includes a Flue Gas Condenser heat exchanger condensate line having:
   a first end connected to the condensate system between the pump and the zeroth serial low pressure heater; and
   a second end connected to the condensate system between the zeroth serial low pressure heater and the first of the serial low pressure heaters.

8. The coal fired Oxy boiler power plant of claim 1 further including a combustion system having an Air Separation Unit, for generating an oxygen rich stream, the Air Separation Unit having an Air Separation Unit heat exchanger with an Air Separation Unit heat exchanger condensate line connected to the condensate system such that the Air Separation Unit heat exchanger is fluidly parallel to at least two of the serial low pressure heaters.

9. The coal fired Oxy boiler power plant of claim 8 wherein the Air Separation Unit heat exchanger condensate line has a second end, downstream of the Air Separation Unit heat exchanger, connected to the condensate system between a second of the serial low pressure heaters (8) and a third of the serial low pressure heaters.

10. The coal fired Oxy boiler power plant of claim 8 wherein the Air Separation Unit heat exchanger condensate line has a second end, downstream of the Air Separation Unit heat exchanger, connected to the condensate system between a third of the serial low pressure heater and a fourth of the serial low pressure heaters.

11. A coal fired Oxy boiler power plant including:
   a condensate system comprising:
      a pump for pressuring condensate;
      a plurality of serial low pressure heaters arranged in flow series downstream of the pump and numbered sequentially in a direction of condensate flow; and
      at least one parallel low pressure heater arranged fluidly parallel to at least one of a first of the serial low pressure heaters,
   a combustion system having an Air Separation Unit, for generating an oxygen rich stream, the Air Separation Unit having an Air Separation Unit heat exchanger with an Air Separation Unit heat exchanger condensate line connected to the condensate system such that the Air Separation Unit heat exchanger is fluidly parallel to at least two of the serial low pressure heaters,
   a CO2 capture system configured and arranged to remove CO2 from a flue gas stream of the boiler having:
      a Flue Gas Heat Recovery System having:
         a Flue Gas Heat Recovery System heat exchanger; and
         a Flue Gas Heat Recovery System thermal fluid line connected to:
            the Flue Gas Heat Recovery System heat exchanger; and
            the at least one parallel low pressure heater,
      a Gas Processing unit having:
         a Gas Processing Unit heat exchanger;
         a Gas Processing Unit thermal fluid line connected to:
            the Gas Processing Unit heat exchanger; and
            the at least one parallel low pressure heater, and
      a Flue Gas Condenser heat exchanger having:
         a Flue Gas Condenser heat exchanger condensate line that is thermally connected to the Flue Gas Condenser heat exchanger, the Flue Gas Condenser heat exchanger condensate line having:
            a first end connected to the condensate system between the pump and the first of the serial low pressure heaters; and
            a second end connected to the condensate system between the first end and the first of the serial low pressure heaters,
   wherein the Air Separation Unit heat exchanger condensate line has an upstream end connected to the condensate system between the second end of the Flue Gas Condenser heat exchanger condensate line and the first of the serial low pressure heaters, and
   wherein the Flue Gas Heat Recovery System thermal fluid line and the Gas Processing Unit thermal fluid line form a thermal fluid loop.

12. A coal fired Oxy boiler power plant including:
   a condensate system comprising:
      a pump for pressuring condensate;
      a plurality of serial low pressure heaters arranged in flow series downstream of the pump and numbered sequentially in a direction of condensate flow; and
      at least one parallel low pressure heater arranged fluidly parallel to at least one of a first of the serial low pressure heaters,
   a combustion system having an Air Separation Unit, for generating an oxygen rich stream, the Air Separation Unit having an Air Separation Unit heat exchanger with an Air Separation Unit heat exchanger condensate line connected to the condensate system such that the Air Separation Unit heat exchanger is fluidly parallel to at least two of the serial low pressure heaters,
   a CO2 capture system configured and arranged to remove CO2 from a flue gas stream of the boiler having:
      a Flue Gas Heat Recovery System having:
         a Flue Gas Heat Recovery System heat exchanger; and
         a Flue Gas Heat Recovery System thermal fluid line connected to:
            the Flue Gas Heat Recovery System heat exchanger; and
            the at least one parallel low pressure heater,
      a Gas Processing unit having:
         a Gas Processing Unit heat exchanger;
         a Gas Processing Unit thermal fluid line connected to:

the Gas Processing Unit heat exchanger; and
the at least one parallel low pressure heater, and
a Flue Gas Condenser heat exchanger having:
  a Flue Gas Condenser heat exchanger condensate line that is thermally connected to the Flue Gas Condenser heat exchanger, the Flue Gas Condenser heat exchanger condensate line having:
    a first end connected to the condensate system between the pump and the first of the serial low pressure heaters; and
    a second end connected to the condensate system between the first end and the first of the serial low pressure heaters,
wherein the Air Separation Unit heat exchanger condensate line has an upstream end connected to the condensate system between the first end of the Flue Gas Condenser heat exchanger condensate line and the pump, and
wherein the Flue Gas Heat Recovery System thermal fluid line and the Gas Processing Unit thermal fluid line form a thermal fluid loop.

13. The coal fired Oxy boiler power plant of claim 1 wherein the CO2 capture system further includes a Flue Gas Condenser heat exchanger having a Flue Gas Condenser heat exchanger condensate line that is thermally connected to the Flue Gas Condenser heat exchanger, the Flue Gas Condenser heat exchanger condensate line having:
  a first end connected to the condensate system between the pump (3) and the first of the serial low pressure heaters; and
  a second end connected to the condensate system between the first end and the first of the serial low pressure heaters.

14. The coal fired Oxy boiler power plant of claim 13 wherein the condensate system includes a bypass valve located between the first end of the Flue Gas Condenser heat exchanger condensate line and the second end of the Flue Gas Condenser heat exchanger condensate line.

15. The coal fired Oxy boiler power plant of claim 1 wherein the Flue Gas Heat Recovery System thermal fluid line includes a back-up cooler.

16. The coal fired Oxy boiler power plant of claim 1 wherein the Gas Processing Unit thermal fluid line includes a control valve adapted to adjust a flow of thermal fluid through the Gas Processing Unit heat exchanger.

17. The coal fired Oxy boiler power plant of claim 1 wherein the Flue Gas Heat Recovery System thermal fluid line includes a control valve downstream of an upstream end of the Gas Processing Unit thermal fluid line and upstream of a downstream end of the Gas Processing Unit thermal fluid line wherein the control valve is adapted to adjust a flow of thermal fluid through the Flue Gas Heat Recovery System heat exchanger.

18. The coal fired Oxy boiler power plant of claim 1 further comprising a control valve in the condensate system parallel to the at least one parallel heater.

19. The coal fired Oxy boiler power plant of claim 2 further comprising a control valve in the condensate system parallel to the at least one parallel low pressure heater, wherein the control valve is located downstream of the second of the serial low pressure heaters.

20. The coal fired Oxy boiler power plant of claim 2 further comprising a control valve in the condensate system parallel to the at least one parallel low pressure heater wherein the control valve is located downstream of a third of the serial low pressure heaters.

* * * * *